United States Patent
Iida et al.

(10) Patent No.: US 10,293,619 B2
(45) Date of Patent: May 21, 2019

(54) METALLIC IMAGE FORMING METHOD

(71) Applicant: CANON KABUSHIKI KAISHA, Tokyo (JP)

(72) Inventors: Kenichi Iida, Kawasaki (JP); Taketoshi Okubo, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/538,390

(22) PCT Filed: Mar. 30, 2016

(86) PCT No.: PCT/JP2016/061188
§ 371 (c)(1),
(2) Date: Jun. 21, 2017

(87) PCT Pub. No.: WO2016/159388
PCT Pub. Date: Oct. 6, 2016

(65) Prior Publication Data
US 2017/0368836 A1    Dec. 28, 2017

(30) Foreign Application Priority Data
Apr. 2, 2015 (JP) ................................ 2015-076121

(51) Int. Cl.
| | | |
|---|---|---|
| *B41J 2/21* | (2006.01) | |
| *B41J 2/01* | (2006.01) | |
| *B41M 5/00* | (2006.01) | |
| *C09D 11/322* | (2014.01) | |

(52) U.S. Cl.
CPC ............. *B41J 2/2103* (2013.01); *B41J 2/01* (2013.01); *B41J 2/21* (2013.01); *B41M 5/0011* (2013.01); *B41M 5/0023* (2013.01); *B41M 5/0047* (2013.01); *B41M 5/0058* (2013.01); *B41M 5/0076* (2013.01); *C09D 11/322* (2013.01)

(58) Field of Classification Search
CPC ... B41J 2/2103; B41J 2/21; B41J 2/01; B41M 5/0023; B41M 5/0011; B41M 5/0047; B41M 5/0058; B41M 5/0076; C09D 11/322
See application file for complete search history.

(56) References Cited

U.S. PATENT DOCUMENTS

| | | | | |
|---|---|---|---|---|
| 6,299,979 B1 * | 10/2001 | Neubauer | ................ | C08J 3/126 106/499 |
| 8,408,691 B2 | 4/2013 | Koike et al. | | |
| 2010/0053267 A1 * | 3/2010 | Seishin | ................ | B41J 2/2107 347/43 |
| 2011/0216968 A1 * | 9/2011 | Fillion | ................ | G06K 9/00 382/163 |
| 2011/0234667 A1 | 9/2011 | Okubo et al. | | |
| 2012/0033263 A1 * | 2/2012 | Rich | ................ | B41M 5/0023 358/3.06 |
| 2012/0056922 A1 | 3/2012 | Yoshida | | |
| 2012/0056937 A1 | 3/2012 | Kagata | | |
| 2012/0223992 A1 | 9/2012 | Hirata et al. | | |
| 2012/0288645 A1 * | 11/2012 | Zhou | ................ | B41M 5/0035 428/32.34 |
| 2013/0222462 A1 | 8/2013 | Okubo et al. | | |
| 2013/0286069 A1 | 10/2013 | Aoyama et al. | | |
| 2015/0232678 A1 | 8/2015 | Okubo et al. | | |
| 2017/0029642 A1 | 2/2017 | Okubo et al. | | |

FOREIGN PATENT DOCUMENTS

| | | | |
|---|---|---|---|
| JP | 2010-052248 A | | 3/2010 |
| JP | 2010-115920 A | | 5/2010 |
| JP | 2012-096467 | * | 5/2012 |
| JP | 2012-096467 A | | 5/2012 |
| JP | 2012-179864 A | | 9/2012 |

OTHER PUBLICATIONS

Oct. 12, 2017 International Preliminary Report on Patentability in International Patent Appln. No. PCT/JP2016/061188.
Jun. 21, 2016 International Search Report and Written Opinion in International Patent Appln. No. PCT/JP2016/061188.

* cited by examiner

*Primary Examiner* — Henok D Legesse
(74) *Attorney, Agent, or Firm* — Venable LLP

(57) ABSTRACT

Provided is a metallic image forming method by which a metallic image that assumes sufficient metallic feeling can be acquired. The metallic image forming method is a method of forming a metallic image on a recording medium through use of an ink containing metal particles and includes an ink application step of applying an ink onto a recording medium having an underlayer formed thereon such that the ink overlaps at least a part of the underlayer, the underlayer having a black color or an opposite color with respect to diffusion light of the ink.

21 Claims, No Drawings

METALLIC IMAGE FORMING METHOD

TECHNICAL FIELD

The present invention relates to a metallic image forming method.

BACKGROUND ART

Hitherto, an inkjet recording method using an ink containing silver particles that show a metallic color has been considered for the purpose of expressing an image having a colored portion that shows a metallic color in a recorded matter, such as an advertisement printed matter or a picture (PTL 1).

CITATION LIST

Patent Literature

PTL 1: Japanese Patent Application Laid-Open No. 2012-179864

SUMMARY OF INVENTION

According to one aspect of the present invention, there is provided a metallic image forming method of forming a metallic image on a recording medium through use of an ink containing metal particles, the method including an ink application step of applying an ink onto a recording medium having an underlayer formed thereon such that the ink overlaps at least a part of the underlayer, the underlayer having a black color or an opposite color with respect to diffusion light of the ink.

According to the present invention, there can be provided a metallic image forming method by which a metallic image that assumes sufficient metallic feeling can be acquired.

Further features of the present invention will become apparent from the following description of exemplary embodiments.

DESCRIPTION OF EMBODIMENTS

Preferred embodiments of the present invention will now be described in detail.

Investigations made by the inventors of the present invention have found that, in the method disclosed in PTL 1, diffusion light from a silver-colored portion, which is formed by applying an ink containing silver particles having particle diameters of from several nanometers to several tens of nanometers onto a recording medium, shows a yellow color, and as a result, there is a problem that a yellow color is visually recognized by human's eyes depending on a viewing angle with respect to an image, and sufficient metallic feeling is not obtained. Further, in the method disclosed in PTL 1, a color that is visually recognized other than a metallic color further changes depending on the particle diameters of the silver particles, and metallic feeling of an image is degraded in some cases. For example, red light is shown at a particle diameter of about 30 nm, and green light is shown at a particle diameter of about 110 nm. Thus, metallic feeling is degraded similarly.

Meanwhile, in the case of an ink containing gold particles, diffusion light from a gold-colored portion obtained by applying an ink containing gold particles having particle diameters of from several nanometers to ten and several nanometers onto a recording medium is visually recognized as a wine red color. Further, when the particle diameters of the gold particles are about 70 nm, a blue color is shown. It has been found that the ink containing gold particles also has a problem that metallic feeling may be degraded similarly to the ink containing silver particles.

As a method of solving the above-mentioned problems, there has been known a method involving applying an ink containing silver particles or gold particles as metal particles onto a recording medium and then subjecting the metal particles to heat treatment to fuse the metal particles to each other, to thereby enlarge a particle diameter. However, a printed matter is heated when the metal particles are fused, and hence image quality is degraded in some cases.

Thus, the present invention is directed to providing a metallic image forming method by which a metallic image that assumes sufficient metallic feeling can be acquired.

Now, the present invention is described in detail by way of exemplary embodiment.

The inventors of the present invention first have made investigations of the reason that sufficient metallic feeling is not obtained merely by applying an ink containing metal particles that show a metallic color (hereinafter sometimes simply referred to as "metallic ink" or "ink") onto a recording medium. As a result, the inventors of the present invention have found that regular reflection light with respect to light incident on an image (reflection light that is reflected in a specular direction at the same reflection angle as that of an incident angle of the incident light) shows a metallic color, but diffusion light that is reflected at a reflection angle different from that of the regular reflection light assumes a hue different from that of the metallic color. Then, it has been found that this diffusion light causes the above-mentioned metallic color to be "unclear". The inventors of the present invention have assumed the mechanism in which diffusion light that is reflected at a reflection angle different from that of regular reflection light assumes a hue different from that of a metallic color as described below. Regular reflection light that shows a metallic color is mainly reflected from the surfaces of metal particles so as to have a hue derived from a metal. Meanwhile, it is considered that diffusion light is obtained when light having a wavelength region that shows an opposite color with respect to a color corresponding to light absorbed by the metal particles in a recording medium is reflected at an interface between the recording medium and the metal particles, in the recording medium, or the like and is released. The absorption of light having a particular wavelength by the metal particles is considered to be caused by the resonant vibration between the metal particles and light absorbed.

Based on the above-mentioned findings, the inventors of the present invention have considered that intended metallic feeling can be obtained when the above-mentioned diffusion light is reduced, and have made investigations in detail to accomplish the present invention.

That is, in the present invention, intended high metallic feeling can be obtained by forming an "underlayer" capable of reducing diffusion light in advance in a region that overlaps at least a part of a region onto which a metallic ink is applied. As the "underlayer" capable of reducing diffusion light, there is given a black underlayer or an underlayer having an opposite color with respect to diffusion light of the metallic ink. The former can reduce diffusion light by absorbing diffusion light of the metallic ink, and the latter can reduce diffusion light by cancelling diffusion light of the metallic ink.

The metallic image forming method of the present invention, and each material to be used in the method are described below.

[Metallic Image Forming Method]

<Ink Application Step>

The image forming method according to the present invention includes an ink application step of applying an ink onto a recording medium. In this case, it is necessary that the ink be applied onto the recording medium so that at least a part of the ink overlaps an underlayer having a black color or an opposite color with respect to diffusion light of the ink to be described later. Further, in order to acquire an image having higher metallic feeling, it is preferred that a region on the surface of the recording medium, onto which the ink is applied, be included in a region onto which the region of the underlayer is applied, and it is more preferred that the region onto which the ink is applied and the region of the underlayer be substantially the same. Now, the recording medium and the ink are described.

(Recording Medium)

As the recording medium to be used in the metallic image forming method of the present invention, for example, there may be given permeable recording media subjected to surface treatment, such as plain paper, coated paper, art paper, and cast-coated paper. Further, non-permeable recording media, such as a vinyl chloride sheet and a resin film, e.g., a polyethylene terephthalate (PET) film, may be used. The recording medium is not limited thereto, and for example, fabric, wood, a plastic material, and a metal material may be used.

Further, in the present invention, the recording medium may be opaque or transparent. The term "transparent recording medium" as used herein refers to a recording medium that has a high transmittance to a light beam in at least a part of a wavelength region when the light beam, such as a UV-ray, visible light, or infrared light, enters the recording medium formed of the above-mentioned material. A high transmittance means that the quantity of light transmitted through the recording medium is larger than that of light reflected from the recording medium. For example, when a light beam that enters the recording medium formed of the above-mentioned material is visible light, the term "transparent" means that the recording medium is colorless and transparent or colored and transparent. Further, the term "opaque recording medium" refers to a recording medium except the above-mentioned transparent recording medium. Examples of the opaque recording medium include the above-mentioned vinyl chloride sheet and resin film, such as a PET film, a plastic material, and a glass material. In the present invention, when the opaque recording medium is used, it is preferred that the ink be applied onto the surface of the recording medium having an underlayer formed thereon in the ink application step. Meanwhile, when the transparent recording medium is used, it is preferred that the ink be applied onto the surface of the recording medium on an opposite side of the surface having the underlayer formed thereon in the ink application step.

(Ink)

In the present invention, the ink can form a metallic image on the recording medium together with the above-mentioned "underlayer". In the present invention, the ink contains metal particles that show a metallic color on the recording medium. The term "metallic color" as used herein refers to a metal color having metallic luster, such as a gold color, a silver color, or a bronze color. Further, in the present invention, as the "metal particles", there are given particles including a metal material, such as gold, silver, platinum, copper, or palladium, at least in surface portions, and there are no particular limitations on the "metal particles" as long as the particles show a metallic color on the recording medium. Further, any one kind of those metal materials may be used alone, or two or more kinds thereof may be used in combination. It is preferred that the metal particles have an average particle diameter of 3 nm or more and 130 nm or less. Further, the average particle diameter of the metal particles is more preferably 10 nm or more, and is more preferably 100 nm or less. When the average particle diameter of the metal particles is 3 nm or more, a metallic image that shows a metallic color can be effectively acquired. Further, when the average particle diameter of the metal particles is 130 nm or less, dispersion stability in the ink can be further improved. The average particle diameter of the metal particles can be measured with, for example, a dynamic light scattering particle diameter distribution measuring device "LB-550" (trade name; manufactured by Horiba, Ltd.). Further, in the present invention, the average particle diameter refers to a weight average particle diameter.

Whether or not an image is a metallic image can be determined by a procedure described below. First, a film containing metal particles is formed on a recording medium having a smooth surface (for example, a recording medium having an arithmetic average roughness Ra of 0.001 µm or less, such as a quartz glass wafer). As a method of forming the film, for example, there are given a dipping method, a spin coating method, a bar coating method, and a vapor-deposition method. Next, angle dependency of lightness $L^*$ that indicates the lightness of the formed film is measured through use of a deflection angle spectrophotometer, and a film containing metal particles having a value of clarity represented by an expression (A): clarity=L/w of 0.2 or more can be determined as a metallic image. As the deflection angle spectrophotometer, for example, there is given GSP-2 (trade name; manufactured by Murakami Color Research Laboratory Co., Ltd.). In this case, L represents the highest lightness value of lightness $L^*$ measured in a light-receiving portion of the deflection angle spectrophotometer, and w represents a width of a light-receiving angle of two points indicating a half-value of L (L/2). When the value of clarity is 0.2 or more, lightness changes depending on a viewing angle, and hence a color is visually recognized as a metallic color. Further, in order to show a further excellent metallic color, the clarity is preferably 0.4 or more, more preferably 1.0 or more.

It is preferred that the ink contain a resin, an organic solvent, a surfactant, and water in addition to the above-mentioned metal particles.

The ink may be any of an aqueous ink containing 50 mass % or more of water and a non-aqueous ink containing less than 50 mass % of water. In addition to the above-mentioned components, as necessary, the ink may contain a pH adjuster, an antifoam agent, a inhibitor, an antiseptic, a fungicide, an antioxidant, an anti-reduction agent, an evaporation accelerator, a chelating agent, a water-soluble resin, or the like. The components except the metal particles in the ink may be colored, but it is preferred that the components do not reduce a metallic color.

In the present invention, the thickness of a layer derived from a metallic ink formed on the recording medium is preferably 0.01 µm or more, more preferably 0.03 µm or more, still more preferably 0.05 µm or more. Further, the thickness is preferably 100 µm or less, more preferably 10 µm or less, still more preferably 1 µm or less.

<Underlayer Forming Step>

In the present invention, it is preferred that, prior to the ink application step, an underlayer forming step of forming an underlayer having a black color or an opposite color with respect to diffusion light of the ink on the recording medium be performed. Specifically, it is preferred that the underlayer forming step be the step of applying a black ink or an ink having an opposite color with respect to diffusion light of the ink (hereinafter sometimes referred to as "underlayer ink") onto the recording medium.

Now, the underlayer ink is described.

(Underlayer Ink)

In the present invention, the underlayer having a black color or an opposite color with respect to diffusion light of the ink can be formed by applying a black ink or an ink having an opposite color with respect to diffusion light of the ink onto the recording medium.

In the present invention, when the black ink is used as the underlayer ink, it is preferred that the underlayer ink contain a black color material. Further, even when the underlayer ink does not contain a black color material, a black color may be formed with a process color obtained by mixing a plurality of inks, such as a yellow ink, a magenta ink, and a cyan ink. The term "black color" as used herein means that, when a solid image sample having a duty of 100% is recorded on the recording medium, the image sample has absorption in the entire region of a wavelength of light of 380 nm or more and 780 nm or less. Further, when the image sample is measured for a color through use of a D50 light source environment in a color measurement system not including a regular reflection light component of an integrating sphere type spectrophotometric colorimeter (A measurement is performed in accordance with a method described in the "Condition c" section described in JIS Z 8722 in a measurement principle specified under the international standard of ISO 7724/1. This measurement method is also based on a measurement method of an object color specified by CIE No. 15 that is International Commission on Illumination, and ASTM E1164 standardized by American Society of Testing Materials (ASTM)), in the CIEL*a*b* color system, the lightness L* is preferably 35 or less, more preferably 25 or less, particularly preferably 15 or less. When the lightness L* is 35 or less, diffusion light can be reduced sufficiently, and a natural metallic image can be acquired.

Further, in the present invention, when the ink having an opposite color with respect to diffusion light of the ink is used as the underlayer ink, it is preferred that the underlayer ink contain a color material which shows an opposite color with respect to diffusion light of the ink. The term "diffusion light" as used herein refers to light obtained by removing regular reflection light (specular reflection light) from reflection light of light that enters an image at a particular incident angle. For example, the diffusion light can be measured for a color through use of a D50 light source environment in a color measurement system not including a regular reflection light component of an integrating sphere type spectrophotometric colorimeter in a region of a wavelength of 380 nm or more and 780 nm or less. The term "opposite color" as used herein refers to a hue that satisfies a relationship of the following expression (1).

Hue angle of diffusion light of an image formed with the ink+162°≤hue angle of diffusion light of an image formed with the opposite color≤hue angle of the diffusion light of the image formed with the ink+198°    Expression (1)

It is preferred that the ink have an opposite color which has a relationship of a complementary color with diffusion light of the ink, with respect to chromaticity a* value and b* value of the metallic ink indicated by the CIEL*a*b* color system.

Further, in the present invention, it is preferred that a* and b* of an opposite color in the CIEL*a*b* color system (referred to as "$a_2^*$" and "$b_2^*$"), and a* and b* of an ink (referred to as "$a_1^*$" and "$b_1^*$") satisfy the following relationship.

$$|\{(a_1^*)^2+(b_1^*)^2\}^{1/2}-\{(a_2^*)^2+(b_2^*)^2\}^{1/2}|\leq 30$$

The left side of the above-mentioned expression represents a difference in distance from the origin (a*=0, b*=0) of an a*b* plane in the CIEL*a*b* color system. As the difference is smaller, that is, as the difference is closer to 0, a reducing effect on diffusion light by an opposite color is higher, and hence a metallic image that assumes more preferred metallic feeling is acquired.

Further, in the present invention, it is preferred to use the black ink as the underlayer ink because metallic feeling of a metallic image can be further improved.

Diffusion light from the metallic ink and the underlayer ink applied onto the recording medium, and from a metallic image can be measured by a specular component excluded (SCE) system of a spectrophotometric colorimeter (trade name: CM-2600d; manufactured by Konica Minolta, Inc.). In the present invention, a D50 light source (specified under JIS Z 8720:2012) preferred for measuring a color of a printed matter can be used as light source environment conditions for measuring a color in a color measurement system not including a regular reflection light component of an integrating sphere type spectrophotometric colorimeter. The light source to be used for measuring a color is not limited to the D50 light source, and an A light source, a C light source, or a D65 light source (specified under JIS Z 8720:2012) may be used. Further, besides those, an F2 light source, an F6 light source, an F7 light source, an F8 light source, an F10 light source, or an F12 light source may be used. Depending on the recording conditions and environments, a preferred light source can be appropriately used. In the case where the black ink is used as the underlayer ink, similar effects are obtained even when any light source is used.

In the underlayer ink, components similar to those except metal particles to be used in a metallic ink can be used. The components except the color material in the underlayer ink may be colored, but it is preferred that the components do not reduce a hue derived from the color material.

In the present invention, the thickness of a layer derived from the underlayer ink formed on the recording medium is preferably 0.001 μm or more, more preferably 0.01 μm or more, still more preferably 0.05 μm or more. Further, the thickness is preferably 10 μm or less, more preferably 5 μm or less, still more preferably 1 μm or less. There are no particular limitations on a method of measuring a layer thickness as long as the layer thickness of a thin film on the order of nanometers can be measured. For example, a layer thickness may be measured by cutting out a cross-section of an image and observing the cross-section with a scanning electron microscope. An image having improved metallic feeling can be acquired by forming an image through use of an ink on an underlayer on the same surface of an opaque, or translucent or transparent recording medium. Alternatively, an image having improved metallic feeling can also be acquired by forming an underlayer on one surface of a translucent or transparent recording medium capable of exhibiting effects of the underlayer, and forming an image with an ink on the other surface.

(Ink Application Method)

In the image forming method of the present invention, there are no particular limitations on a method of applying a metallic ink and an underlayer ink, and any known printing method and image forming method can be applied. For example, there may be given printing methods, such as gravure printing, flexo printing, offset printing, screen printing, and relief printing, or on-demand small-scale printing methods, such as inkjet printing and laser printing. Of those methods, inkjet printing is preferred because each ink can be easily applied onto any position on a recording medium.

EXAMPLES

The present invention is described below more specifically by way of Examples and Comparative Examples. The present invention is not limited to the following Examples as long as the present invention does not depart from the gist. Further, "part" and "%" in the following are based on a mass unless otherwise stated. Further, an ink was prepared so that the total of all constituent components was set to 100 parts.

<Preparation of Metallic Ink>

(Metallic Ink 1)

Commercially available Silver Nanocolloid H-1 (trade name; manufactured by Mitsubishi Materials Electronic Chemicals Co., Ltd.) and the following components were mixed so that the concentration of a solid content of the Silver Nanocolloid H-1 and a resin dispersant in an ink became 5%. Thus, a metallic ink 1 was prepared.

Glycerin: 10 parts
Acetylenol EH (trade name; manufactured by Kawaken Fine Chemicals Co., Ltd.): 1.0 part
Ion-exchanged water: balance The average particle diameter of the Silver Nanocolloid H-1 was measured to be 32 nm with a dynamic light scattering particle diameter distribution measuring device LB-550 (trade name; manufactured by Horiba, Ltd.).

(Metallic Ink 2)

AuPVP colloid solution (trade name; manufactured by Tanaka Kikinzoku Kogyo K.K.) as commercially available gold particles and the following components were mixed so that the concentration of a solid content of the AuPVP colloid solution and a resin dispersant in an ink became 5%. Thus, a metallic ink 2 was prepared.

Glycerin: 10 parts
Acetylenol EH (trade name; manufactured by Kawaken Fine Chemicals Co., Ltd.): 1.0 part
Ion-exchanged water: balance The average particle diameter of the AuPVP colloid solution was measured to be 10 nm with a transmission electron microscope (manufactured by Hitachi High-Technologies Corporation).

<Preparation of Underlayer Ink>

(Underlayer Ink 1)

A commercially available BCI-7eBk black ink (trade name; manufactured by Canon Inc.) was used as an underlayer ink 1.

<Image Forming Method>

Comparative Example 1

(First Ink)

The metallic ink 1 was used as the first ink.

(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink described in Comparative Example 1 was filled into an ink cartridge of F930. Then, a solid image of 3 cm×3 cm was printed onto an inkjet photo paper serving as a recording medium (Gloss Photo Paper Pro PR-201 (trade name); manufactured by Canon Inc.).

(Evaluation of Image)

An image formed by the above-mentioned image forming method was visually checked. As a result, the formed image was found to be an unnatural metallic image in which regular reflection light with respect to incident light showed a silver color, but diffusion light except the regular reflection light showed a yellow color. Further, this image was measured by a specular component excluded (SCE) system of a spectrophotometric colorimeter (trade name: CM-2600d; manufactured by Konica Minolta, Inc.). As a result, L* was 80.2, a* was 2.5, and b* was 18.9 in the CIEL*a*b* color system, and thus yellow diffusion light was confirmed.

Example 1

(First Ink)

The first ink described in Comparative Example 1 (metallic ink 1) was used as the first ink.

(Underlayer Ink)

The underlayer ink 1 was used as the underlayer ink.

(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink and the underlayer ink described in Example 1 were filled into an ink cartridge of F930. Then, the underlayer ink was printed onto an inkjet photo paper serving as a recording medium (Gloss Photo Paper Pro PR-201 (trade name); manufactured by Canon Inc.) so as to form a solid image of 3 cm×3 cm. After that, the first ink was printed onto the region having the underlayer ink printed thereonto so as to form a solid image of 3 cm×3 cm.

(Evaluation of Image)

An image formed by the above-mentioned image forming method was visually checked. As a result, the formed image was found to be a metallic image in which both regular reflection light with respect to incident light and diffusion light showed natural silver metallic colors. Further, this image was measured by a specular component excluded (SCE) system of a spectrophotometric colorimeter (trade name: CM-2600d; manufactured by Konica Minolta, Inc.). As a result, L* was 50.5, a* was −4.5, and b* was 1.9 in the CIEL*a*b* color system, and thus it was confirmed that yellow diffusion light was reduced. Further, the layer thicknesses of the first ink and the underlayer ink applied onto the recording medium were 500 nm and 300 nm, respectively.

Comparative Example 2

(First Ink)

The metallic ink 2 was used as the first ink.

(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink described in Comparative Example 2 was filled into an ink cartridge of the F930. Then, a solid image of 3 cm×3 cm was printed onto an inkjet photo paper serving as a recording medium (Gloss Photo Paper Pro PR-201 (trade name); manufactured by Canon Inc.).
(Evaluation of Image)

An image formed by the above-mentioned image forming method was visually checked. As a result, the formed image was found to be an unnatural metallic image in which regular reflection light with respect to incident light showed a gold color, but diffusion light except the regular reflection light showed a wine red color. Further, this image was measured by a specular component excluded (SCE) system of a spectrophotometric colorimeter (trade name: CM-2600d; manufactured by Konica Minolta, Inc.). As a result, $L^*$ was 14.9, $a^*$ was 22.1, and $b^*$ was −6.9 in the CIE$L^*a^*b^*$ color system, and thus wine red diffusion light was confirmed.

Example 2

(First Ink)

The first ink described in Comparative Example 2 (metallic ink 2) was used as the first ink.
(Underlayer Ink)

The underlayer ink 1 described in Example 1 was used as the underlayer ink.
(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink and the underlayer ink described in Example 2 were filled into an ink cartridge of F930. Then, the underlayer ink was printed onto an inkjet photo paper serving as a recording medium (Gloss Photo Paper Pro PR-201 (trade name); manufactured by Canon Inc.) so as to form a solid image of 3 cm×3 cm. After that, the first ink was printed onto the region having the underlayer ink printed thereonto so as to form a solid image of 3 cm×3 cm.
(Evaluation of Image)

An image formed by the above-mentioned image forming method was visually checked. As a result, the formed image was found to be a metallic image in which both regular reflection light with respect to incident light and diffusion light showed natural gold metallic colors. Further, this image was measured by a specular component excluded (SCE) system of a spectrophotometric colorimeter (trade name: CM-2600d; manufactured by Konica Minolta, Inc.). As a result, $L^*$ was 7.6, $a^*$ was 5.2, and $b^*$ was 0.8 in the CIE$L^*a^*b^*$ color system, and thus it was confirmed that wine red diffusion light was reduced. Further, the layer thicknesses of the first ink and the underlayer ink applied onto the recording medium were 500 nm and 300 nm, respectively.

Comparative Example 3

(First Ink)

The first ink described in Comparative Example 1 (metallic ink 1) was used as the first ink.
(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink described in Comparative Example 3 was filled into an ink cartridge of F930. Then, a solid image of 3 cm×3 cm was printed onto a double sided printing OHP film 27078 (trade name; manufactured by A-one) serving as a transparent recording medium.
(Evaluation of Image)

The surface of the recording medium having the first ink applied thereonto serving as a front surface was visually checked. As a result, the formed image was found to be an unnatural metallic image in which regular reflection light with respect to incident light showed a silver color, but diffusion light except the regular reflection light showed a yellow color. Further, this image was measured by a specular component excluded (SCE) system of a spectrophotometric colorimeter (trade name: CM-2600d; manufactured by Konica Minolta, Inc.). As a result, $L^*$ was 76.4, $a^*$ was 2.3, and $b^*$ was 17.9 in the CIE$L^*a^*b^*$ color system, and thus yellow diffusion light was confirmed.

Example 3

(First Ink)

The first ink described in Comparative Example 1 (metallic ink 1) was used as the first ink.
(Underlayer Ink)

The underlayer ink 1 described in Example 1 was used as the first underlayer ink.
(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink and the underlayer ink described in Example 3 were filled into an ink cartridge of F930. Then, the underlayer ink was printed onto one surface of a double sided printing OHP film 27078 (trade name; manufactured by A-one) serving as a transparent recording medium so as to form a solid image of 3 cm×3 cm. After that, the first ink was printed at a position that faced and overlapped the region having the underlayer ink printed thereonto through intermediation of the OHP film on the other surface of the transparent recording medium so as to form a solid image of 3 cm×3 cm.
(Evaluation of Image)

The surface of the recording medium having the first ink applied thereonto serving as a front surface was visually checked. As a result, the formed image was found to be a metallic image which showed a silver metallic color. Further, this image was measured by a specular component excluded (SCE) system of a spectrophotometric colorimeter (trade name: CM-2600d; manufactured by Konica Minolta, Inc.). As a result, $L^*$ was 47.3, $a^*$ was −3.1, and $b^*$ was 1.9 in the CIE$L^*a^*b^*$ color system, and thus it was confirmed that yellow diffusion light was reduced. Further, the layer thicknesses of the first ink and the underlayer ink applied onto the recording medium were 500 nm and 300 nm, respectively.

Comparative Example 4

(First Ink)

The first ink described in Comparative Example 2 (metallic ink 2) was used as the first ink.
(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink was filled into an ink cartridge of F930. Then, a solid image of 3 cm×3 cm was printed onto a double sided printing OHP film 27078 (trade name; manufactured by A-one) serving as a transparent recording medium.

(Evaluation of Image)

The surface of the recording medium having the first ink applied thereonto serving as a front surface was visually checked. As a result, the formed image was found to be an unnatural metallic image in which regular reflection light with respect to incident light showed a gold color, but diffusion light except the regular reflection light showed a wine red color. Further, this image was measured by a specular component excluded (SCE) system of a spectrophotometric colorimeter (trade name: CM-2600d; manufactured by Konica Minolta, Inc.). As a result, L* was 13.7, a* was 19.6, and b* was −5.4 in the CIEL*a*b* color system, and thus wine red diffusion light was confirmed.

Example 4

(First Ink)

The first ink described in Comparative Example 2 (metallic ink 2) was used as the first ink.

(Underlayer Ink)

The underlayer ink 1 described in Example 1 was used as the underlayer ink.

(Image Forming Method)

In order to form an image, F930 (trade name; recording head manufactured by Canon Inc.; 6 ejection port arrays, each having 512 nozzles, ink amount: 4.0 pl (fixed quantity), highest resolution: 1,200 dpi (horizontal)×1,200 dpi (vertical)) was used. First, the first ink and the underlayer ink described in Example 4 were filled into an ink cartridge of F930. Then, the underlayer ink was printed onto one surface of a double sided printing OHP film 27078 (trade name; manufactured by A-one) serving as a transparent recording medium so as to form a solid image of 3 cm×3 cm. After that, the first ink was printed at a position that faced and overlapped the region having the underlayer ink printed thereonto through intermediation of the OHP film on the other surface of the transparent recording medium so as to form a solid image of 3 cm×3 cm.

(Evaluation of Image)

The surface of the recording medium having the first ink applied thereonto serving as a front surface was visually checked. As a result, the formed image was found to be a metallic image which showed a gold metallic color. Further, this image was measured by a specular component excluded (SCE) system of a spectrophotometeric colorimeter (trade name: CM-2600d; manufactured by Konica Minolta, Inc.). As a result, L* was 7.2, a* was 19.3, and b* was −5.4 in the CIEL*a*b* color system, and thus it was confirmed that wine red diffusion light was reduced. Further, the layer thicknesses of the first ink and the underlayer ink applied onto the recording medium were 500 nm and 300 nm, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-076121, filed Apr. 2, 2015, which is hereby incorporated by reference herein in its entirety.

The invention claimed is:

1. A metallic image forming method comprising:
preparing an ink containing metal particles;
preparing a recording medium having an underlayer having one of (i) a black color for absorbing diffusion light of the metal particles and (ii) an opposite color with respect to diffusion light of the metal particles for cancelling the diffusion light of the metal particles; and
printing with the ink onto the recording medium such that the ink overlaps at least a part of the underlayer to form a metallic image having a metallic hue derived from the metal particles.

2. The metallic image forming method according to claim 1, wherein the underlayer having the opposite color is formed by applying an ink having the opposite color with respect to the diffusion light of the metal particles onto the recording medium.

3. The metallic image forming method according to claim 2, wherein the ink having the opposite color with respect to the diffusion light of the metal particles is applied onto the recording medium through use of an inkjet recording head.

4. The metallic image forming method according to claim 1, wherein the black color has absorption in an entire region of a wavelength of light of 380 nm or more and 780 nm or less, and has a lightness L* of 25 or less in a CIEL*a*b* color system.

5. The metallic image forming method according to claim 1, wherein the opposite color satisfies a relationship of the following expression (1), $$\text{Hue angle of diffusion light of an image formed with the ink} + 162° \leq \text{hue angle of diffusion light of an image formed with the opposite color} \leq \text{hue angle of the diffusion light of the image formed with the ink} + 198°. \quad \text{Expression (1):}$$

6. The metallic image forming method according to claim 1, wherein the metal particles have an average particle diameter of 3 nm or more and 130 nm or less.

7. The metallic image forming method according to claim 1, wherein the ink is printed onto the recording medium through use of an inkjet recording head.

8. The metallic image forming method according to claim 1, wherein the recording medium comprises an opaque recording medium, and the printing with the ink comprises printing with the ink onto a surface of the recording medium having the underlayer formed thereon.

9. The metallic image forming method according to claim 1, wherein the recording medium comprises a transparent recording medium, and the printing with the ink comprises printing with the ink onto a surface of the recording medium on an opposite side of a surface having the underlayer formed thereon.

10. The metallic image forming method according to claim 9, wherein the transparent recording medium is a resin film, a plastic material, or a glass material.

11. The metallic image forming method according to claim 1, wherein the underlayer has the black color.

12. The metallic image forming method according to claim 11, wherein the underlayer having the black color is formed by applying (i) a black ink onto the recording medium or (ii) mixing a yellow ink, a magenta ink, and a cyan ink onto the recording medium.

13. The metallic image forming method according to claim 12, wherein the thickness of a layer derived from the ink forming the underlayer is 0.05 μm or more to 1 μm or less.

14. The metallic image forming method according to claim 12, wherein the black ink is applied onto the recording medium through use of an inkjet recording head.

15. The metallic image forming method according to claim 1, wherein the underlayer has the opposite color with respect to the diffusion light of the metal particles.

16. The metallic image forming method according to claim 15, wherein the ink having the opposite color with respect to the diffusion light of the metal particles contains a color material that shows an opposite color with respect to the diffusion light of the metal particles.

17. The metallic image forming method according to claim 16, wherein the thickness of a layer derived from the ink formed on the recording medium is 0.05 μm or more to 1 μm or less.

18. The metallic image forming method according to claim 1, wherein the recording medium is permeable recording media subjected to surface treatment.

19. The metallic image forming method according to claim 18, wherein the permeable recording media is plain paper, coated paper, art paper, or cast-coated paper.

20. The metallic image forming method according to claim 1, wherein the printing with the ink is performed by gravure printing, flexo printing, offset printing, screen printing, relief printing, or on-demand, small-scale printing.

21. The metallic image forming method according to claim 1, wherein the metal particles are one of silver particles and gold particles.

* * * * *